United States Patent [19]
Jensen et al.

[11] Patent Number: 6,157,956
[45] Date of Patent: *Dec. 5, 2000

[54] HETEROGENEOUS COMPUTING INTERFACE APPARATUS AND METHOD USING A UNIVERSAL CHARACTER SET

[75] Inventors: Jeffrey J. Jensen, Eagan; David McCaffrey, Wayzata; Daniel Skrove, Chanhassen, all of Minn.

[73] Assignee: global Maintech, inc., Eden Prairie, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/828,378

[22] Filed: Mar. 28, 1997

[51] Int. Cl.⁷ .............................. G06F 13/38; G06F 15/17
[52] U.S. Cl. .............................. 709/246; 709/250; 710/65
[58] Field of Search .............................. 395/200.76, 885, 395/500; 341/50–107; 709/246, 224, 228, 250; 710/65; 395/500.46

[56] References Cited

U.S. PATENT DOCUMENTS

| | | | |
|---|---|---|---|
| 4,425,664 | 1/1984 | Sherman et al. | 375/8 |
| 4,800,510 | 1/1989 | Vinberg et al. | |
| 4,852,019 | 7/1989 | Vinberg et al. | |
| 4,897,799 | 1/1990 | Le Gall et al. | 364/514 |
| 4,918,602 | 4/1990 | Bone et al. | |
| 4,935,736 | 6/1990 | Meierdierck | 340/825.69 |
| 4,974,160 | 11/1990 | Bone et al. | |
| 5,063,523 | 11/1991 | Vrenjak | 364/514 |
| 5,095,444 | 3/1992 | Motles | |
| 5,226,120 | 7/1993 | Brown et al. | 395/200 |
| 5,241,482 | 8/1993 | Iida et al. | |
| 5,243,543 | 9/1993 | Notess | 364/550 |
| 5,293,608 | 3/1994 | Johnson et al. | |
| 5,325,361 | 6/1994 | Lederer et al. | |
| 5,339,434 | 8/1994 | Rusis | 395/700 |
| 5,390,132 | 2/1995 | Shio et al. | 364/514 |
| 5,406,557 | 4/1995 | Baudoin | 370/61 |
| 5,437,046 | 7/1995 | Bright et al. | |
| 5,442,791 | 8/1995 | Wrabetz et al. | |

(List continued on next page.)

OTHER PUBLICATIONS

Boole & Babbage, Inc., "Central Point–of–Control for Proactive Management," Feb. 23, 1996, pp. 1–2.
Boole & Babbage, Inc., "Command/Post, Product Info," Feb. 23, 1996, pp. 1–3.
Boole & Babbage, Inc., "Welcome to Boole & Babbage!," Copyright 1995, pp. 1–2.
Boole & Babbage, Inc., "Command/Post 3.1, Product Announcement," Copyright 1994.
Boole & Babbage, Inc., "Intercommunications 3.1, Technology Announcement," undated.
Boole & Babbage, Inc., "Command/Post, Family Brochure," undated.
Boole & Babbage, Inc., "Command/Post™, Product Overview," undated.
Boole & Babbage, Inc., "A White Paper on AutoCommand and Enterprise Automation," Copyright 1992.
Candle Corporation, "About Candle," Feb. 23, 1996, p. 1.
Candle Corporation, "MVS/Mainframe Solutions," Feb. 23, 1996, p. 1.
Candle Corporation, "Automation/Console Management," Feb. 23, 1996, p. 1.

(List continued on next page.)

*Primary Examiner*—Mark H. Rinehart
*Attorney, Agent, or Firm*—Merchant & Gould P.C.

[57] ABSTRACT

A method, apparatus, and article of manufacture for monitoring and controlling computer systems. The invention provides an intelligent card and a monitoring and control unit coupled to the intelligent card. The intelligent card translates a data stream form a host computer system into a universal data stream. The universal data stream is communicated to the monitoring and control unit via a standard network protocol for performing operations based on the universal data stream.

18 Claims, 6 Drawing Sheets

U.S. PATENT DOCUMENTS

| | | |
|---|---|---|
| 5,452,415 | 9/1995 | Hotka .................................... 395/161 |
| 5,471,615 | 11/1995 | Amatsu et al. . |
| 5,490,252 | 2/1996 | Macera et al. .................. 395/200.01 |
| 5,497,373 | 3/1996 | Hulen et al. ............................. 370/79 |
| 5,524,253 | 6/1996 | Pham et al. ............................ 395/800 |
| 5,530,857 | 6/1996 | Gimza . |
| 5,583,757 | 12/1996 | Baca, Jr. et al. . |
| 5,592,664 | 1/1997 | Starkey . |
| 5,631,827 | 5/1997 | Nicholls et al. . |
| 5,708,828 | 1/1998 | Coleman ............................... 395/785 |
| 5,715,397 | 2/1998 | Ogawa et al. .................. 395/200.18 |
| 5,742,778 | 4/1998 | Hao et al. . |
| 5,751,964 | 5/1998 | Ordanic et al. . |
| 5,768,361 | 6/1998 | Cowgill . |
| 5,768,552 | 6/1998 | Jacoby . |
| 5,781,909 | 7/1998 | Logan et al. . |
| 5,784,635 | 7/1998 | McCallum ........................ 395/800.32 |
| 5,790,809 | 8/1998 | Holmes . |
| 5,822,585 | 10/1998 | Noble et al. . |
| 5,872,931 | 2/1999 | Chivaluri . |
| 5,892,937 | 4/1999 | Caccavale . |

OTHER PUBLICATIONS

Candle Corporation, "Candle Command Center," Feb. 23, 1996, pp. 1–2.

Computer Associates International, Inc., "Welcome to Computer Associates," Copyright 1996, pp. 1–2.

Computer Associates International Inc., "CA–Unicenter®/ The Next Generation™," Feb. 23, 1996, pp. 1–2.

Computer Associates International Inc., "CA–Unicenter, Technology Is My Passion," Feb. 23, 1996, pp. 1–2.

Computer Associates International, Inc., "Prevail/XP–Automation Point," Feb. 23, 1996, pp. 1–2.

Computer Associates International, Inc., "Prevail/XP–Automation Point Technical Features," Feb. 23, 1996, p. 1.

Computer Associates International, Inc., "Prevail/XP–Automation Point Requirements," Feb. 23, 1996, p. 1.

Computer Associates International, Inc., "Prevail/XP–Multi–image ManagerÖ," Feb. 23, 1996, pp. 1–4.

Computer Associates International, Inc., "CA–Unicenter®, Enterprise Management Software," Copyright 1995.

IBM®, "Not a bad day's work for someone who never left their desk," Copyright 1995, p. 1.

IBM®, "Mastering the fine art of systems management . . . ," Copyright 1995, p. 1.

IBM®, "Systems Management," Copyright 1995, pp. 1–2.

IBM®, "Systems Management/SystemView Technologies," Copyright 1995, pp. 1–2.

IBM®, "SystemView Agents," Copyright 1995, pp. 1–2.

IBM®, "SystemView Agent Technology," Copyright 1995, pp. 1–6.

IBM®, "DMI Service Layer & Software Developers Kit," Copyright 1995, pp. 1–4.

IBM®, "Key systems vendors to deploy common Agent technology," Copyright 1995, pp. 1–5.

The Reference Press, Inc., Hoover's Company Profile Database, "Boole & Babbage, Inc.," Copyright 1996, pp. 1–3.

The Reference Press, Inc., Hoover's Company Profile Database, "Computer Associates International, Inc.," Copyright 1996, pp. 1–5.

The Reference Press, Inc., Hoover's Company Profile Disease, "Legent Corporation," Copyright 1996, pp. 1–3.

"Global Watch™ Enterprise Control System Operations", *global MAINTECH, inc.*, 110 pages (Manual Version: draft Jan. 12, 1996).

HETEROGENEOUS COMPUTING INTERFACE APPARATUS AND METHOD USING A UNIVERSAL CHARACTER SET

BACKGROUND OF THE INVENTION

1. Field of the Invention

This invention relates in general to monitoring and control systems, and in particular to an electronic monitoring and control system for externally monitoring processes in one or more computer systems.

2. Description of Related Art

Computing environments are integrated with others across a room, in another building, and perhaps in another part of the country. To help aid in the monitoring process of these computing environments, many of these computer systems include an operating console which is displayed on a video display. The operating console shows the status of various system components such as disk drives, chillers, data communication lines, etc.

The functioning of integrated computing environments requires the automation of some of the routine control situations like restarting a computer system, calling a repair or service representative, and rerouting data communication links. Such automation has been done in the past by adding additional hardware and software agents or processes which run on the computer system being monitored. The disadvantage of such approaches are that they are inflexible to changes made to the underlying computer system. For example, if a controller board is added to a mainframe computer and then that system is updated to a new data bus type, the old controller board is no longer useful. Similarly, when software agents are run on the computer system to be monitored, they must be tailored to the operating system being run on the computer system and must be tested to determine whether they interfere with other software or processes which are to be run on the computer system.

A better solution to this monitoring and control problem would be to find a way to perform these operations without adding hardware or software to the computer system to be monitored. The present invention provides a solution to this and other problems, and offers other advantages.

SUMMARY OF THE INVENTION

The present invention discloses a method, apparatus, and article of manufacture for monitoring and controlling computer systems. The invention provides an intelligent card and a monitoring and control unit coupled to the intelligent card. The intelligent card translates a data stream form a host computer system into a universal data stream. The universal data stream is communicated to the monitoring and control unit via a standard network protocol for performing operations based on the universal data stream.

BRIEF DESCRIPTION OF THE DRAWINGS

Referring now to the drawings in which like reference numbers represent corresponding parts throughout.

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
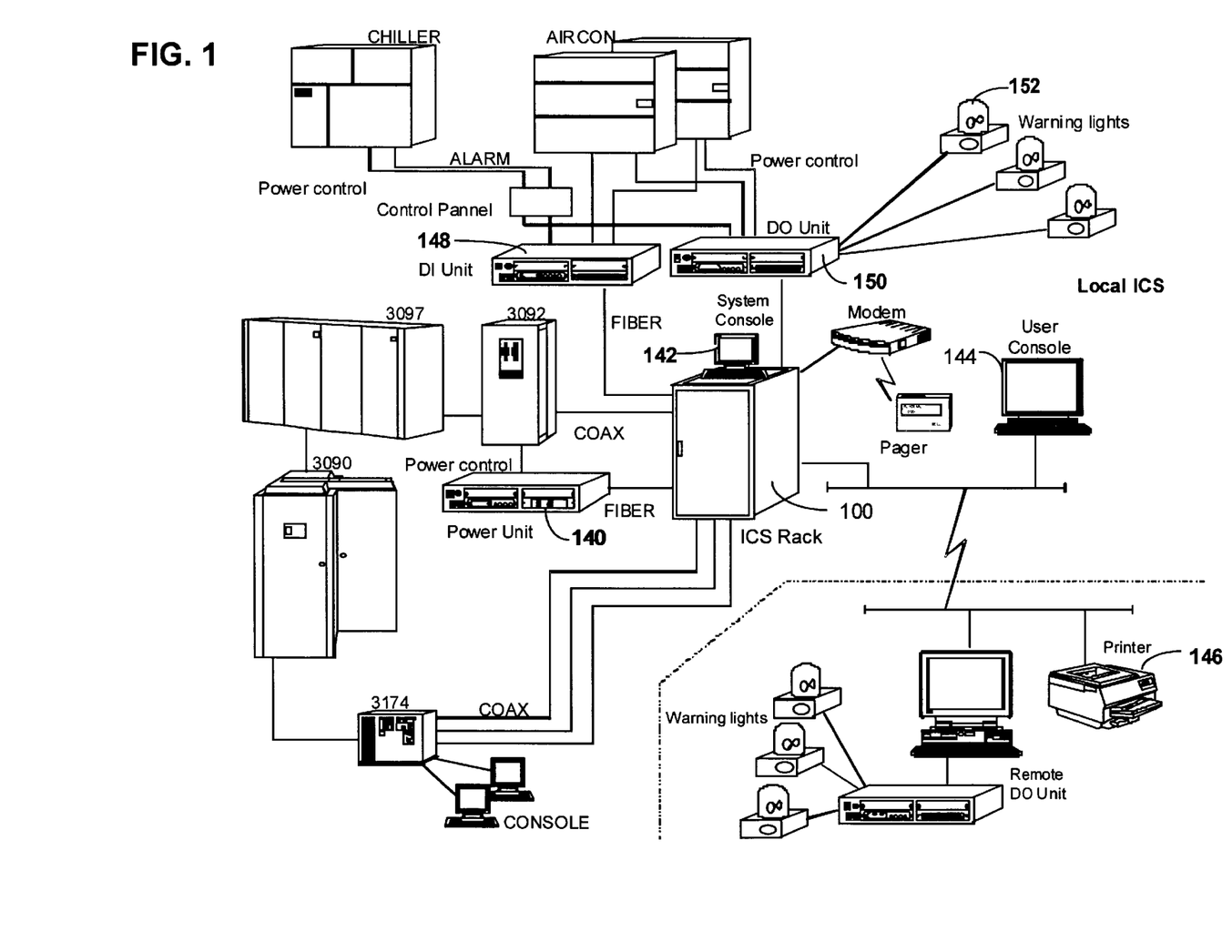
FIG. 1 is a block diagram of a monitoring and control system in accordance with a preferred embodiment of the present invention.

FIG. 1 is an exemplary illustration of a monitoring and control system 100 according the present invention. The monitoring and control system 100 has an Intelligent Console System (ICS) 102 for automating operations—monitoring, operating, and alerting of all processes performed or observed. This includes mainframe startup (power on, IML, IPL, etc.), mainframe shutdown (OS shutdown, CPU power off, etc.), operational monitoring and controlling of the complex (scanning and alerting of messages and signals, responding to operational processing, initiating recovery responses, etc.), and operational consolidation (multiple data centers or servers monitored and controlled from a single location).

The monitoring and control system 100 is entirely outboard—there are no invasive "hooks" to any of the host environments. Not only does this approach make installation simple and fast, but expensive host CPU time is not used by the ICS 102 monitoring and automation routines.

FIG. 1 illustrates a one example of a monitoring and control system 100 installation according to the present invention. It will be appreciated by those skilled in the art that the interface types and quantity of components depend on each installation and as such the particular arrangement described below is for illustrative purposes only.

The ICS 102 rack houses the main processing components including a central processing unit (CPU) case, Universal Service Bus unit (USB), and power distribution unit (PDU). The CPU case includes a hot-swappable redundant power supply, hard disk, tape drive, UNIX operating system, and the ICS software. Each USB unit has a 15 slot capacity for interface cards. One slot is used for the interface to the ICS CPU and the other 14 slots house the connectivity interface cards.

The Power Distribution Unit (PDU) 140 protects the ICS equipment 102 with its built in circuit breakers. Also, The PDU 140 provides a convenient centralized power source for the ICS components from the customer site (i.e., a single 30 A 110V power feed).

The ICS system console 142 preferably is a UNIX VT102 terminal interface and keyboard. The ICS system console 142 is used for starting up and shutting down the ICS 102 (and UNIX) and other administrative activities. The ICS system console 142 connects to the CPU case via a RS232C interface.

The ICS user console 144 is the Xterminal: a large monitor (utilizing a graphical user interface), 3270 keyboard, and mouse. The ICS user console 144 is the user interface to the ICS 102. It connects to the CPU case via a small Ethernet (IEEE802.3) TCP/IP network.

The ICS printer 146 is used for printing ICS logs and scripts. It connects to the CPU case via a small Ethernet (IEEE802.3) TCP/IP network.

The ICS 102 connects to host environments through a plurality of interfaces including digital input and output units, power units, sensor units, interface cards, and network connections.

The ICS digital input (DI) unit 148 is the interface for monitoring warning signals from air conditioners, chillers, water leak sensors, and other equipment with digital interfaces. Each DI unit 148 has an 8 device capacity. A maximum of 16 DI units can be connected to one ICS 102. The DI unit 148 connects to the USB via fiber optic cable, which provides for high interference tolerance and approximately a one mile range. The physical placement of DI units is flexible—normally placed under the raised floor near the equipment connected to it.

The ICS digital output (DO) unit 150 is the interface for controlling air conditioners, chillers, warning lights, and other equipment with digital interfaces. Each DO unit 150 has an 8 device capacity. A maximum of 16 DO units can be connected to one ICS 102. The DO unit 150 connects to the USB via fiber optic cable, which provides for high interference tolerance and approximately a one mile range. The physical placement of DO units is flexible—normally placed under the raised floor near the equipment connected to it.

The ICS power unit 140 is the interface for controlling the power source of mainframe CPUs. Each unit controls one CPU. A maximum of 4 power units can be connected to one ICS 102. The ICS power unit 140 connects to the USB via fiber optic cable, which provides for high interference tolerance and approximately a one mile range. The physical placement of power units is flexible—normally placed under the raised floor near the CPU or CPU control device.

The ICS sensor unit (not shown) has temperature and humidity sensors for monitoring the temperature and humidity at the location the sensor unit is placed. A maximum of 4 sensor units can be connected to one ICS 102. The ICS sensor unit connects to the USB via fiber optic cable, which provides for high interference tolerance and approximately a one mile range. The physical placement of sensor units is flexible—normally placed near a CPU.

The ICS warning light 152 is for alerting support staff that the ICS 102 needs attention. The required attention is generally for a detected problem situation. In operation, the warning light 152 flashes and produces an alarm sound. This type of alerting allows the ICS 102 to operate unattended, alerting support staff when attention is needed. The warning light 152 connects to a DO unit 150. The physical placement of the warning light 152 should be near support staff.

Figure 2:
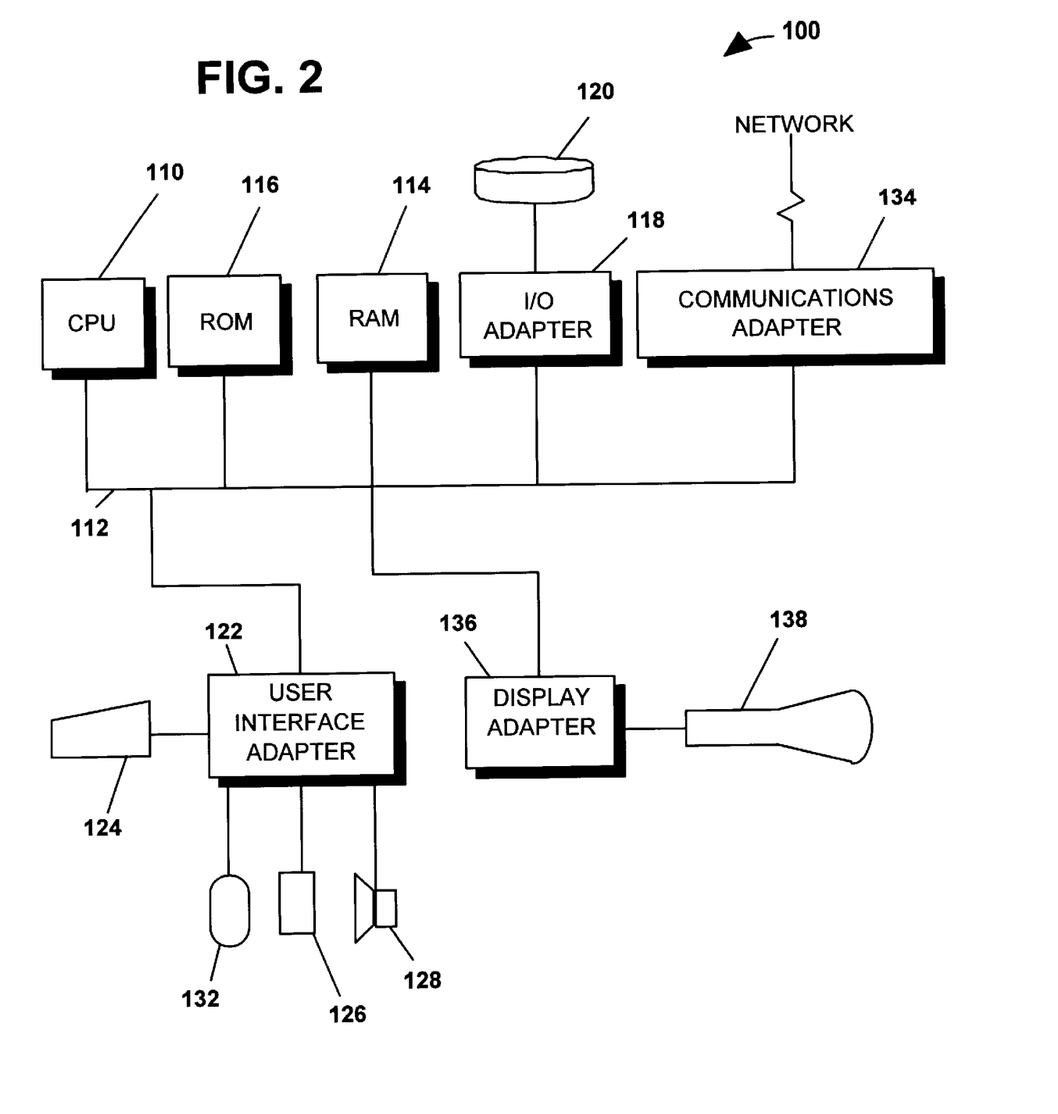
FIG. 2 is a block diagram of an intelligent console system in according to a preferred embodiment monitoring and control system shown in FIG. 1.

FIG. 2 illustrates a system capable of performing the automated control operation of the preferred embodiment intelligent console system (ICS) 102 shown in FIG. 1. The ICS 102 is preferably implemented in the context of an operating system resident on a workstation or personal computer such as the Sun Microsystems® Sparc Station®, IBM® PS/2® or Apple® Macintosh® computer. A representative hardware environment is depicted in FIG. 2, which illustrates a typical hardware configuration of a workstation in accordance with the preferred embodiment having a central processing unit 110, such as a microprocessor, and a number of other units interconnected via a system bus 112. The workstation shown in FIG. 2 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch pad or touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as UNIX® or the Microsoft® Windows NT operating system.

To implement a high-level user interface the ICS 102 uses a UNIX window system (X-Windows with a Motif interface). A pointing device such as a "mouse" is used to manipulate objects in windows on the screen and perform basic operations. The ICS system 102 uses a separate window for each function. Almost all operations can be controlled using the mouse.

Each window shown on the display can be divided into a client region, used for entering and displaying data through graphics or with key input, and a window function region on the periphery, used to control the window.

Enterprise Interface Card (EICard)

Figure 3:
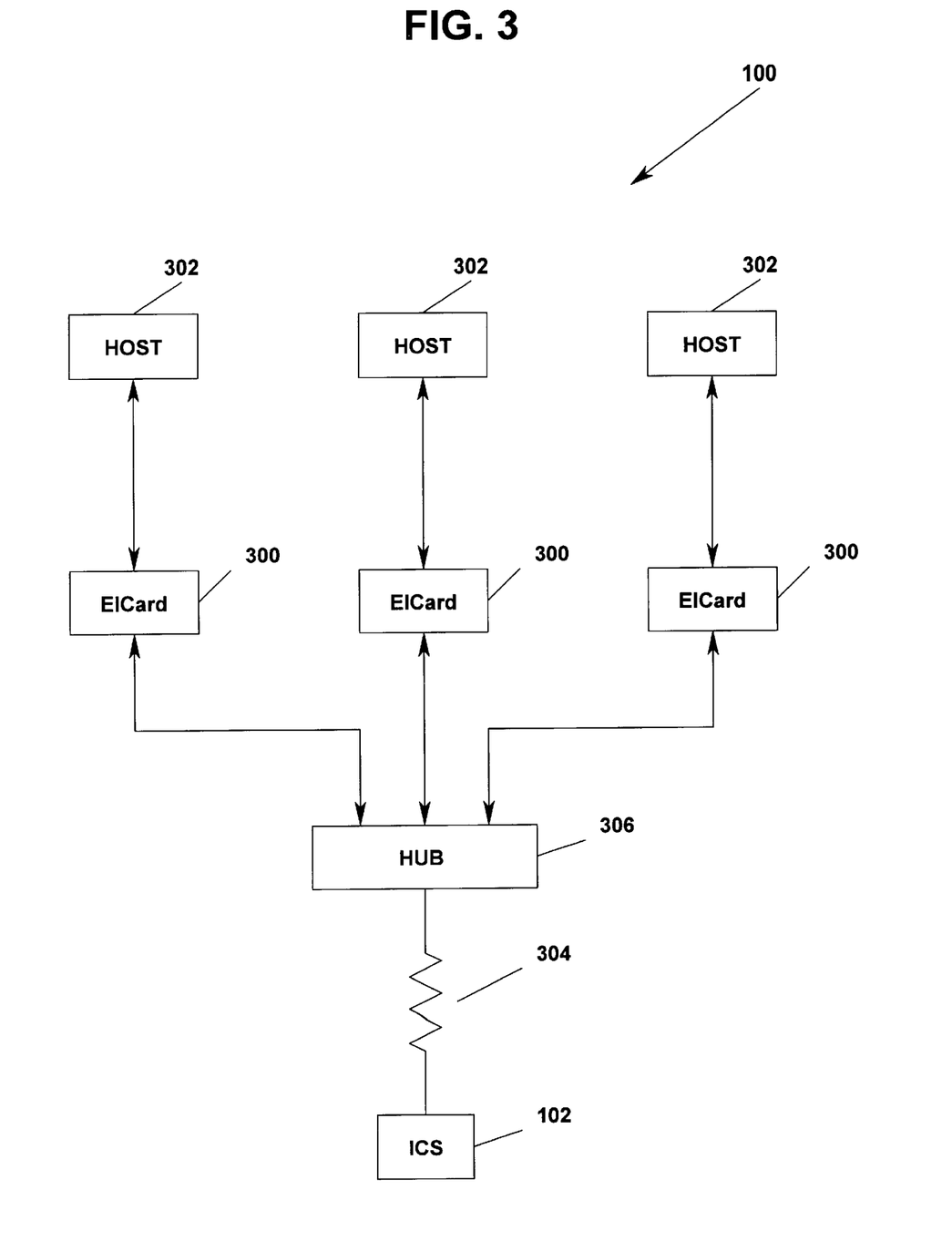
FIG. 3 is a block diagram illustrating the system architecture of an exemplary embodiment of the monitoring and control system according to the present invention.

FIG. 3 is at block diagram illustrating the system architecture of an exemplary embodiment of the monitoring and control system 100 according to the present invention. An Enterprise Interface Card (EICard) 300 acts as an interface between an Ethernet network 304 and a host 302 connection, emulating a device connected to the host 302, and providing device data to the Ethernet network 304 through a network hub 306. The ICS 102 is connected to the Ethernet network 304.

The EICard 300 supports a downloadable code space and several types of hardware part populations, to perform different device emulations. The EICard 300 may support multiple device emulations. The device to be emulated for a given session is determined at installation time.

Figure 4A:
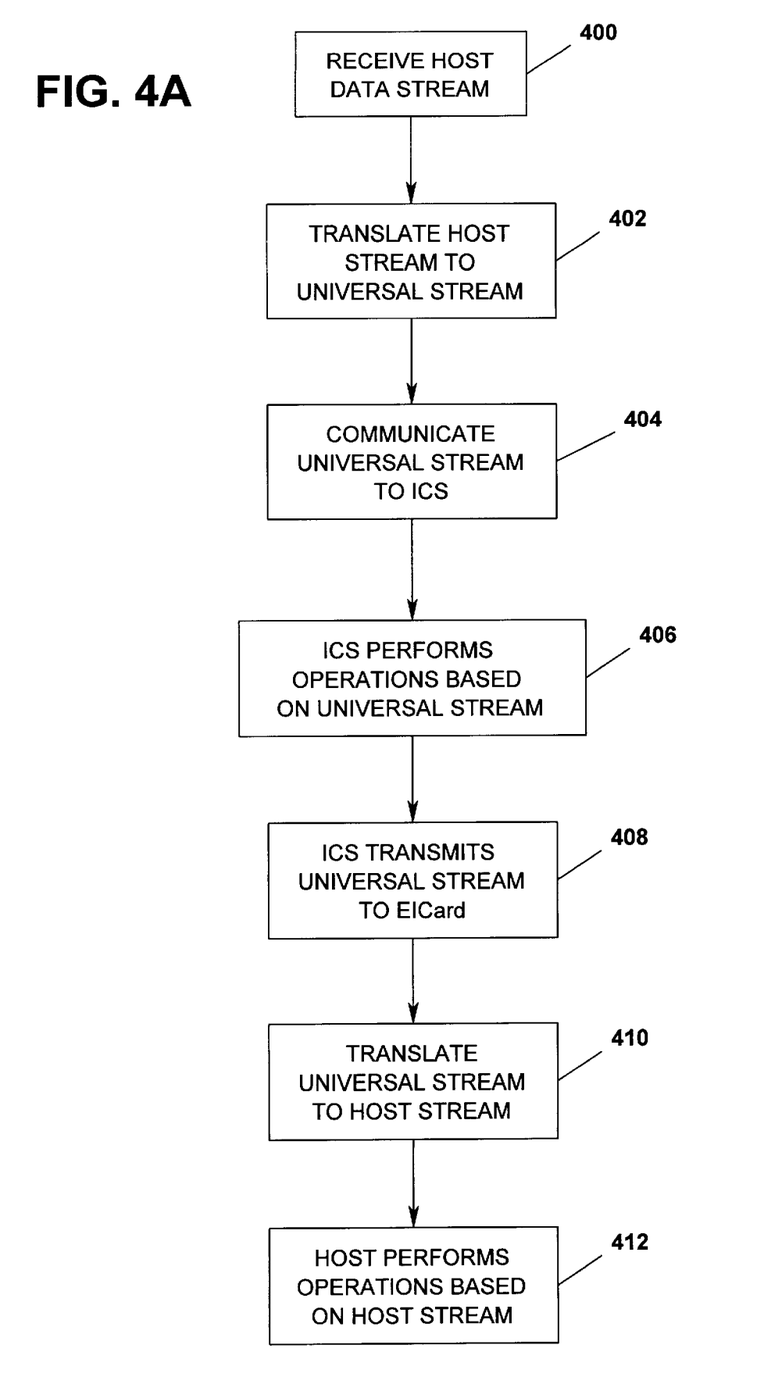
FIGS. 4A and 4B are flow diagrams illustrating the functions performed by the monitoring and control system according to the present invention.
Figure 4B:
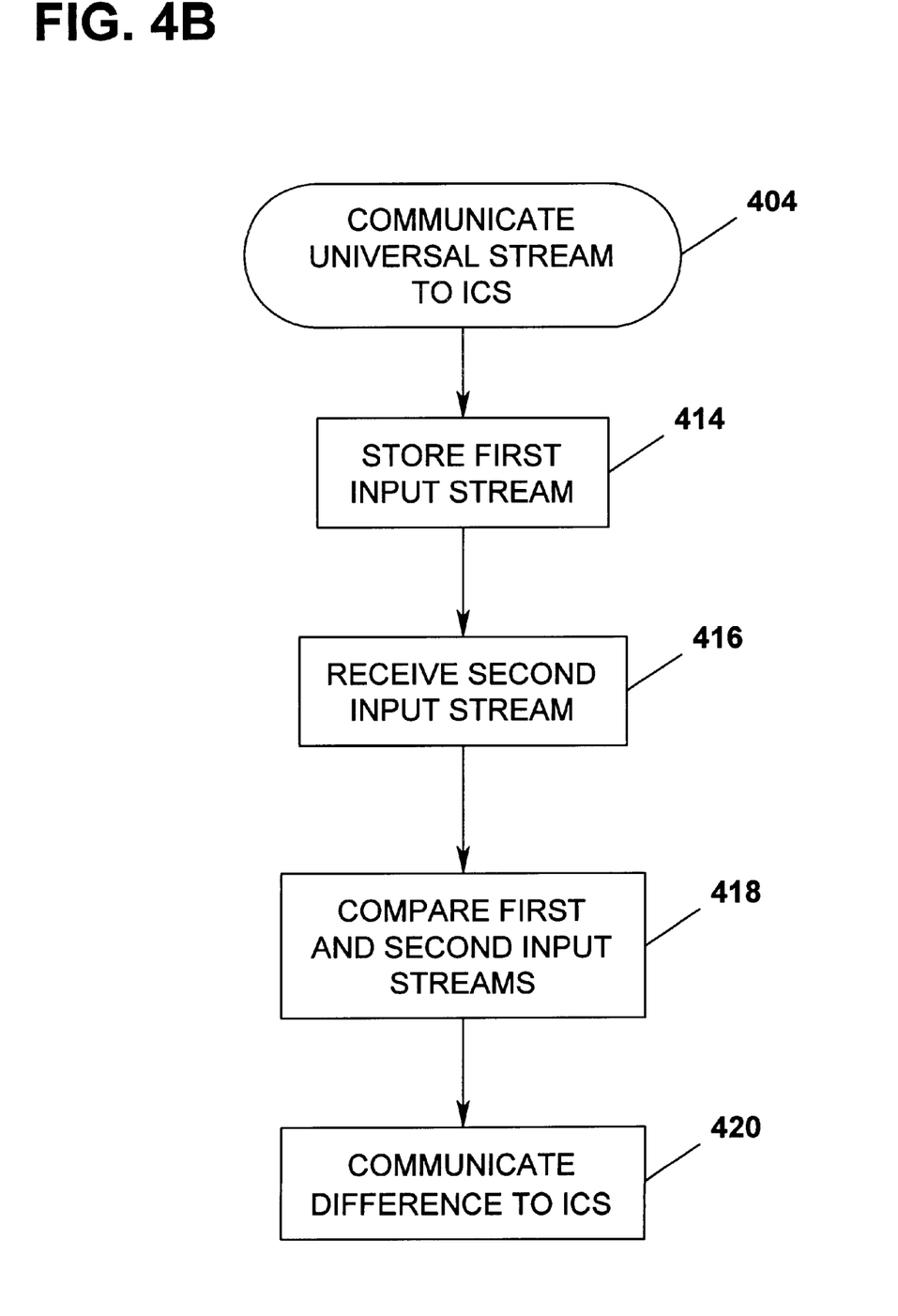

FIGS. 4A and 4B are flow diagrams illustrating the functions performed by the monitoring and control system 100 according to the present invention. Block 400 represents the EICard 300 receiving a data stream in a native character set from the host 302. Block 402 represents the EICard 300 translating the native character set stream to a universal character set stream. The universal character set includes distinct codes to represent each character in a plurality of native character sets. Block 404 represents the EICard 300 communicating the universal character set stream to the ICS 102. The universal character set stream is transmitted via a standard network protocol, e.g., a transport control program/internet protocol (TCP/IP) communication network. Block 406 represents the ICS 102 performing monitoring and control operations based on data received in the universal character set stream.

Block 408 represents the ICS 102 transmitting the universal character set to the EICard 300 in response to performing monitoring and control operations. Block 410 represents the EICard 300 translating the universal character set stream to the host native character set. Block 412 represents the EICard 300 transmitting the host native character set stream to the host 302 and the host 302 performing operations based on the host native character set stream.

FIG. 4B is a flow diagram illustrating the steps performed by the EICard 300 in communicating the universal data stream to the ICS 102 as represented by block 404. Block 414 represents the EICard 300 storing a first host native character set data stream. Block 416 represents the EICard 300 receiving a second host native character set data stream. Block 418 represents the EICard 300 comparing the first and second host native character set data streams. Block 420 represents the EICard 300 communicating the difference between the first and second host native character set data streams to the ICS 102.

EICard Hardware

In one embodiment of the present invention, the functionality of the EICard 300 is implemented in an interface board having at least one processor, RAM, and hardware connections. The EICards 300 are mounted in a cage with a height consistent with terminal and LED presentation to maximize the number of cages that can be mounted in a standard 24" wide rack. There is no practical depth restriction, as the cards mount into a deep rack. All communications connections and LEDs must be accessible/visible from a single edge of the card. Power connections to the card are made at the opposite end of the connector end. Cards must be hot-swappable. A case to house the card cage includes fans and redundant hot-swappable power supplies. Power is made available to the card cage via a PC style 4-pin power connector.

The following LED indicators are visible on the service edge of the EICard 300: A POWER LED indicating green when power is applied to the card. A SELF-TEST LED indicating off immediately after startup, red during initial self-test, or failure of self-test, and green following successful self-test. A DOWNLOAD LED indicates off immediately after startup, blinking red during BOOTP request cycle and whenever no TCP connection is established, off when a TCP connection has been established, but no firmware has been specified, blinking green during download, red on failure of download, and green following successful download. An ETHERNET TRAFFIC LED indicates red during ethernet transmit, green during receive, and off otherwise. A HOST TRAFFIC LED indicates red during transmit to host, green during receive, and off otherwise.

Traffic indicator LEDs are located near their associated connectors, to help confirm their relationship, tempered by the need to keep cables from obscuring view of the LEDs. The POWER, SELF-TEST, and DOWNLOAD LEDs are located in that order, so they light sequentially upon startup. A slot cover is required to close unused card slots in the cage.

Each board has a set of 8 bits worth of jumpers or resistors selectable by populating parts at the time of manufacture, to identify the hardware installed and the revision of the board. The 8 bit code is advanced sequentially whenever a new type of card is created for the first time—either a new board revision or a new combination of populated parts on an existing board. Each emulation firmware includes a list of board IDs with which it is intended to operate. Attempting to download an emulation to a board for which it was not intended results in an error.

The device to be emulated for a given session is selected by the ICS 102 system and associated with a session ID by means of a device ID. Each supported device type, regardless of the firmware that implements it, has a unique ICS 102 device ID.

EICard Execution

Figure 5:
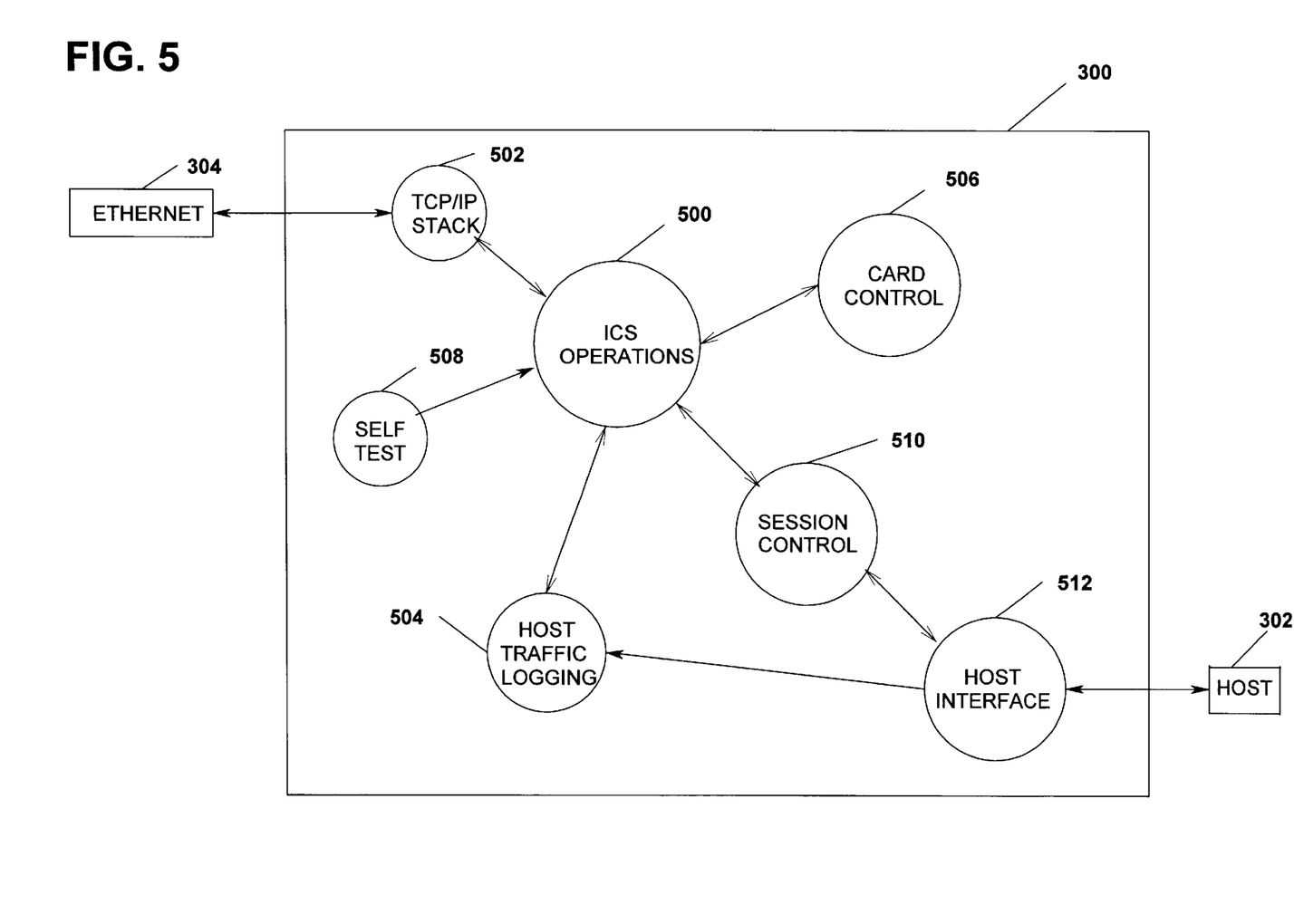
FIG. 5 is a flow diagram illustrating the functions performed by the EICard according to the present invention.

FIG. 5 is a flow diagram further illustrating the functions performed by the EICard 300 according to the present invention as a communications translator showing the ETHERNET bus 304 on which the ICS 102 resides, and the HOST 302 as the externals to the system. Each bubble represents a software process executed by the EICard 300 that performs a function independent of the other processes, with a well-defined interface through which it communicates with other processes. FIG. 5 shows the processes which share an interface via dataflow arrows.

The ICS Operations process 500 interprets the operation stream coming from the ICS 102 via the TCP/IP Stack process 502 and dispatches requests to be serviced by the other processes. It collects data from the other processes and multiplexes it onto the operation stream going to the ICS 102. The send and receive aspects of the process operate independently. The ICS Operations process 500 provides for any conversion required between the network byte ordering and internal processor byte ordering and alignment.

The ICS Operations process 500 is responsible for keeping Ethernet connection status, accumulating Ethernet traffic volume data and session traffic volume and for driving the Ethernet traffic LED, based on the data stream it sends and receives. Estimates are used for header sizes that are attached or removed by lower layers of TCP/IP protocols. Each LED color is driven for a minimum of 50 ms when called for, to make sure it is visible before changing colors.

The receive aspect of the ICS Operations process 500 handles the NOP operation without involving any other processes. Upon receipt of a WRITE CARD CONFIGURATION operation, the beacon rep rate parameter is handled internally and the host log size parameter passed to the Host Traffic Logging process. Similarly, upon receipt of a READ CARD CONFIGURATION operation, the beacon rep rate parameter is obtained internally and the host log size parameter is obtained from the Host Traffic Logging process 504, creating a response to be handled by the send aspect. The receive aspect sends an ERROR to the send aspect when the incoming stream cannot be recognized.

The send aspect of the ICS Operations process 500 is responsible for guaranteeing that the ICS 102 bound stream contains whole operations with their data (an operation is never separated from its data by another operation). It implements the beacon function of sending periodic NOP commands, based on the beacon rep rate. It receives operations to be sent from other processes with data in internal structures, packages the operation as an appropriate byte stream, and sends it to the ICS 102 via the TCP/IP Stack process 502.

The TCP/IP Stack process 502 provides communications with the Ethernet side of the EICard 300 via a BSD sockets interface.

The Card Control process 506 is responsible for cardwide operations and status reporting. It drives the POWER, SELF-TEST, and DOWNLOAD LEDs. It maintains current card status and reports it unsolicited whenever it changes.

The Self Test process 508 is responsible for ongoing tests of the EICard 300 memory and processor resources for proper operation. Upon power-up or a HARD RESET command, thorough RAM tests are performed which would normally result in loss of data, prior to releasing the EICard 300 to normal operation. Thereafter, resources continue to be checked in a nondestructive fashion. Any errors detected result in an effective reset, so that a fault which becomes permanent results in a continuous reset cycle. A watchdog circuit must be satisfied continuously, or a reset is asserted, with a response equivalent to a power-up reset. Once a successful download has occurred (so that code is executed out of the volatile boot block), the integrity of the code being executed is verified on an ongoing basis by checking the checksum of each firmware file against its contents in memory. If a discrepancy is detected, a reset is forced in the same way as a HARD RESET command. The base boot block is never checked for integrity prior to execution, since there is no recovery action available if it should prove corrupted. If any corruption is outside the initial detection code an alternate boot block is used to start up. The alternate boot block is checksummed to detect its presence, and is assumed to be executed only long enough to establish a successful download, so it does not receive any ongoing checking.

The Session Control process 510 is responsible for maintaining a list of sessions being supported. The process validates the session information provided by the ICS in the SPECIFY SESSIONS operation against the device emulations supported by the firmware. Data from the ICS Operations process 500 in the form of KEYCODE operations is translated and sent to the Host Interface process 512. Data from the Host Interface process 512 is buffered. For an open session, the buffered data is translated and sent to the ICS Operations process 500.

The Host Interface process 512 is responsible for communicating with the host 302. It sends and receives data from the Session Control process 510 in character sets native to the host 302—all necessary translations are performed by the Session Control process 510. A window of recent traffic exchanged with the host 302 is logged in host traffic log data format, to be sent to the ICS Operations process 500 along with any host communications errors detected. The Host Interface process 512 also communicates to the ICS Operations process 500 periodic counts of the number of bytes sent to and received from the host 302.

ICS/EICard Interface

The interface between the ICS 102 and the EICard 300 is independent of the host emulation. There can be many EICards 300 coupled to a single ICS 102. The interface message repertoire is the same between each EICard 300 and the ICS 102. EICards 300 do not communicate with each other.

In one embodiment of the present invention, the physical interface between the ICS 102 and EICard 300 is an Ethernet, 102 BaseT on the ICS 102 side, and 10 BaseT on the EICard 300 side, requiring a conversion box in between. The interface requires the following members of the TCP/IP Internet Protocol Suite to be implemented to support the applications which communicate across the interface: BOOTP, TCP, UDP (needed by BOOTP), IP, ICMP, ARP, and ETHERNET.

Applications rely on either UDP or TCP as their communications protocol. For standard application protocols, such as BOOTP, the standard "well-known" port numbers are used. For applications unique to the ICS/EICard environment, a command server implemented by the EICard 300 at port number 8001 handles all interactions. Port 8001 is chosen to be outside the reserved range of well-known port numbers, and to be unlikely to conflict with any dynamically assigned ephemeral port numbers. In any case, it represents a port in the ephemeral port space of the EICard 300, so the EICard 300 can arrange to exclude it from being chosen as an ephemeral port number.

The interface uses the BOOTP protocol for power-up initialization of EICards 300. Its function is to notify the EICard 300 being powered up of its IP address. In order to supply this information to the EICard 300, the ICS 102 must be preconfigured with the IP address for each EICard 300, based on its unique Ethernet address. The capability of BOOTP to supply a filename from which the EICard 300 may boot is NOT utilized. Rather, the ICS 102 initiates firmware downloads at will. The EICard 300 prepares a BOOTP request as follows and broadcasts it to UDP well-known port number 67 at IP address 255.255.255.255.

All other control, session and diagnostic interactions are supported by an operation server at the EICard 300. The ICS 102 has a corresponding operation client that establishes a connection with the EICard 300 operation server at TCP port number 8001.

Once the operation client/server TCP connection has been established, a full-duplex channel exists to support ICS/EICard communications. Each application can generate commands on its forward channel and receive responses on its return channel. Each command or response opens with an opcode by which its nature and size can be determined, so that the stream in any one direction can be blocked into the commands and responses which comprise it. Response messages are interleaved between whole commands, never inserted in the middle of a command message, to make recovery of the individual command and response messages possible.

Each command has an intended source and destination, either the ICS 102 or the EICard 300. Response messages are defined only for commands which require them. A separate opcode is used to send error information. Each command/response message has an opcode and data. The opcode is a 1-byte operation code indicating the operation to be performed, e.g. 0xxxxxxx for commands to the EICard 300 and 1xxxxxxx for responses to the ICS 102. The data is the data associated with the operation. The data may be of fixed length determined by the opcode or of variable length with the first 2 bytes of the opcode representing the length of data to follow if the length of data can be represented in 2 bytes.

Most commands are issued by the ICS 102 command client and handled by the EICard 300 command server, possibly generating a response message. Less commonly, the EICard 300 may generate commands and receive responses from the ICS 102. An EICard 300 may support multiple sessions. The ICS 102 client opens each session for which it desires updates. Once a session is open, the display or printer update data is sent from the EICard 300 as unsolicited messages, whenever the content changes.

The screen being updated is modeled as four one dimensional arrays. A given array index identifies a character position on the screen and an element of each array—one for the character to be displayed, one for the attributes (e.g. blink) and one for the background color, and one for the foreground color. Each one-dimensional array is mapped to the two-dimensional screen grid by wrapping to the next line each time the horizontal dimension of the screen is exceeded. For example, on a 25×80 screen, array characters 0 to 79 appear on the first line, 80 to 159 on the second line, and so on.

To reduce the bandwidth required for screen updates, the screen data transferred uses a stream of sequential operations, rather than a complete image of the character, attribute, and color arrays. The operations represent instructions for how to paint or modify the screen.

The same repertoire of operations is used for exchanging screen update data and printer output data. A printer session merely utilizes a subset of the operations, since it does not support random screen location output.

The opcode set can be extended for feature enhancements or bandwidth optimization by simply adding operations to the existing set. For example, if scrolling displays require too much bandwidth, a command to copy an existing portion of the screen buffer to another address could be added. If screen clearing requires too much bandwidth, a repeated character write operation could be added.

Except where noted, operations are not recognized or generated by the EICard 300 until after a successful firmware download cycle has been completed. Commands received by the EICard 300 prior to a successful download result in an error response.

ICS/EICard Application Programming Interface

The ICS Commanded Operations Application Programming Interface (API) and the EICard Commanded Operations API provide the necessary procedures for the ICS 102 and EICard 300 to communicate to implement the monitoring and control functions of the system 100.

1. ICS Commanded API

The following describe the ICS Commanded API for commands issued by the ICS 102. The NOOPERATION (NOP) command performs no operation and no response is generated. It may be used as padding, or as a means of guaranteeing resynchronization to opcode boundaries. It is supported by the EICard 300 with or without a valid firmware download.

The SPECIFY FIRMWARE operation allows the ICS to specify the firmware to be used by the EICard 300. It is supported only following a power-up or HARD RESET, when the card download status indicates anything but a successful download completed. Once a successful download has been completed, a HARD RESET must be issued to change the firmware. The command contains all the files to be downloaded. When it receives a SPECIFY FIRMWARE command, the EICard 300 initiates a transfer of the specified files via the GET FIRMWARE command. As long as the specified files have not been successfully downloaded, the TCP operation channel remains connected (including if errors occur during the download) and the EICard 300 continues to send beacon NOP messages as needed to keep the channel alive. If the download is successfully completed, the EICard 300 sends a response. Up to 1 second after the response is sent, the EICard 300 drops the TCP connection (ceasing beacon NOP messages) and undergoes a restart, using the newly received firmware. The effect is similar to a hard reset except that no BOOTP request is issued. The EICard 300 then awaits a new TCP connection. Upon TCP connection, it reports the card status, indicating successful download. At this point, the download is complete and a SPECIFY SESSIONS command can now be serviced by the card. If any file download attempt fails, the EICard 300 continues to attempt to download that file, but at a decreasing request frequency with a minimum value of once per minute. It still reports the error and makes firmware status available on the operation connection, if connected. If the download is successful, but the file set is internally incompatible, or incompatible with the card hardware, the error is reported and firmware status is made available, but no further attempts to download are made until a reset occurs or a HARD RESET operation is requested by the ICS 102.

The FIRMWARE STATUS command requests the status of the downloadable firmware files. It is supported with or without a valid firmware download. The ICS issues a command with no data and the EICard 300 sends a response having a set of file data including the file ID, file status, emulation code, and revision code. If no firmware has been downloaded, the response shows a zero length.

The CARD STATUS command requests the general status of the EICard 300. It is supported with or without a valid firmware download. The ICS issues a command with no data and the The EICard 300 sends a response indicating the download status and the ethernet traffic volume. An attempt is made to send the response unsolicited whenever the download status changes, if there is an operation connection on which to report. The response is always sent unsolicited when an operation connection is first established.

The HARD RESET command has the same effect as cycling power to the EICard 300, forcing the EICard 300 to forget all download information and execute its power-up initialization process. It is supported with or without a valid firmware download. There is no response message.

The SOFT RESET command reinitializes and restarts all processes not required to maintain the host connection. It forces all open sessions to be closed and closes all TCP/IP connections. The EICard 300 makes its operation server available and awaits connection by the ICS operation client. The existing firmware is not affected. During the time there is no operation connection available, host traffic is still serviced. Printer output is buffered as long as space remains, discarding the oldest data on a buffer overflow. Screen contents are kept current. Once an operation connection has been established, any sessions opened receive an immediate update of the complete screen contents or any buffered printer output for the session. There is no response message from the EICard 300.

The SPECIFY SESSIONS operation allows the ICS to specify or change the sessions and associated device emulations to be supported by the EICard 300. When it receives a SPECIFY SESSIONS command, the EICard 300 closes any open sessions. Any host connection is momentarily lost. The SPECIFY SESSIONS command includes the host session ID, the ICS session ID, and the device ID. The command contains all the sessions to be emulated. If the session data is found acceptable, the session emulations are begun and the EICard 300 sends a response that acts as a signal that the sessions requested are now supported and session open commands can be serviced by the card. The EICard 300 will always respond, either with the successful response opcode, or with an error opcode.

The ICS 102 issues an OPEN SESSION command to indicate a desire to be informed of screen or printer data for a session. Upon opening a session that was previously closed, a complete screen content update and any buffered print data will be reported. There is no response message.

The ICS 102 issues a CLOSE SESSION command to cease being informed of screen or printer data for a particular session. While a session is closed, host traffic continues, screen contents are kept current, and printer traffic is buffered, discarding the oldest data on a buffer overflow. Upon reopening of the session, a complete screen content update and any buffered print data will be reported. There is no response message. The OPEN SESSION and CLOSE SESSION commands provide a means of traffic control for the ICS 102. By opening sessions only for cards whose data is actually required, the ICS 102 can dynamically optimize network bandwidth usage. If no session closing is desired, the session open operation represents an extra operation that must be sent by the ICS 102 before screen or printer updates will be provided.

The SESSION STATUS command requests the status of a single session. The EICard 300 response includes the host session ID, the ICS session ID, the device ID, an open flag indicating whether the session is open, a session connection status, and a session traffic volume. An attempt is made to send the response unsolicited for any session whose connection status changes, if there is an operation connection on which to report. The response is always sent unsolicited for all sessions when a SPECIFY SESSIONS command is successfully completed.

The WRITE KEYCODE TRANSLATION command supplies the ASCII-to-host keycode translations for a session. Each translation specifies an extended ASCII keycode that may be sent from the ICS 102, and a sequence of bytes to be sent to the host to represent that keycode. The command may be issued to an open or a closed session for any session that has been set up with a prior SPECIFY SESSIONS command. The device being emulated for the session must be one that supports keycode input. Translations must be provided to a session before any keycodes are sent to that session. The entire translation set is sent in a single command. Any previous translations are lost when a new set of translations arrives. There is no response message. There are limits on the number of translations listed for a given session, due to maximum command length restrictions, and on the total number of translations over all sessions, due to storage restrictions. If either of these restrictions is violated, an error is returned. Specifying translations requires intimate knowledge of the host keycode set.

The READ KEYCODE TRANSLATION command requests the current ASCII-to-host keycode translations for a session. The session must be one that has been specified by a prior SPECIFY SESSIONS command for a device that supports keycode input. The EICard 300 issues a response indicating the ICS session ID, an ASCII code for which a keycode translation is specified, the number of host bytes to be generated for the ASCII code, and the number of bytes of keycodes to be sent to the host. Translation entries are returned for all ASCII codes for which a translation is defined.

The WRITE DISPLAYCODE TRANSLATION command supplies the host-to-ASCII display code translations for a session. Each translation specifies a host display code, and an extended ASCII keycode to be sent to the ICS to represent that display code. The command may be issued to any session that has been set up with a prior SPECIFY SESSIONS command. Translations must be provided to a session before opening that session. The entire translation set is sent in a single command. Any previous translations are lost when a new set of translations arrives. There is no response message. There can be at most 768 bytes of translations listed for a given session, or a maximum command length of 772 bytes, including the opcode, length, and ICS session ID, since this size comprises a complete translation set of all possible host displaycodes. There is also a restriction on the total maximum size of translations for all sessions. If either restriction is exceeded, an error is returned. Specifying translations requires intimate knowledge of the host display code set.

The READ DISPLAYCODE TRANSLATION command requests the current host-to-ASCII display code translations for a session. The session must be one that has been specified by a prior SPECIFY SESSIONS command. The EICard 300 issues a response indicating the ICS session ID the Host display code and the ICS display code.

The ICS 102 sends a KEYCODE command to indicate a when a key has been pressed. A session ID is always included with the operation (the concept of selecting a session applies only to the EICard 300 to ICS display updates). There is no response message.

The ICS 102 issues WRITE CARD CONFIG command to set parameters that can be changed during operation, and as such are not part of the downloaded firmware associated with the card. There is no response message.

The ICS 102 issues a READ CARD CONFIG command to view parameters that can be changed during operation, and as such are not part of the downloaded firmware associated with the card.

The ICS 102 issues a READ ETHERNET ADDRESS command to obtain the Ethernet address of the card.

The ICS 102 issues a WRITE ETHERNET ADDRESS command to change the Ethernet address of the card. This command is intended for factory use or to recover from a catastrophic failure in the field. It should not be taken lightly. There is no response message. The EICard 300 responds as if a HARD RESET had been issued, using the new Ethernet address during the subsequent start-up.

2. EICard Commanded API

The following describe the EICard Commanded API for commands issued by the EICard 300. The single byte NOOPERATION command performs no operation and no response is generated. It may be used as padding, or as a means of obtaining resynchronization to opcode boundaries, or as a "keep alive" message to keep some traffic on the bus.

The EICard 300 issues a GET FIRMWARE command to the ICS to request download of a previously specified firmware file. If the ICS does not recognize the requested file ID, it should issue a HARD RESET and initiate a new download via the SPECIFY FIRMWARE command. Otherwise, the ICS 102 returns a response containing the requested file data, including an emulation code and a revision code. Download files are expected to be executable code files. The file data contains the direct binary image of the code to be placed in memory for execution. All the fields except the file ID are provided in a file header with each download file (with all numbers in network byte ordering) so that the ICS 102 locates the file corresponding to the file ID requested and transfers its contents following the response opcode and file ID. The emulation code is intended to identify files which are part of a group of files to be used collectively to create a working firmware. It is used to prohibit the accidental intermixing of files which are not intended to be used together, but which may have the same revision code. The revision code is intended to insure that all files in the download were created by the same build process, and are hence qualified to interoperate. It is a revision number which is advanced whenever any aspect of any firmware file is modified, and applied to all files created by the build process.

The EICard 300 sends a SELECT SESSION command to select the session to which subsequent operations should be directed (for operations which apply to a session). There is no response message.

The EICard 300 sends a SCREEN SIZE command to set the screen size on which subsequent screen addresses will be based for the current session or to indicate the maximum width of lines that will be sent to a printer. It is sent following session open, and whenever the screen size or printer width changes (not after each SELECT SESSION command). There is no response message.

The EICard 300 sends a SCREEN SET ADDRESS command to set the screen address (one-dimensional array index) to which subsequent screen data should be written for the current session. The command applies only to screen-based sessions (not printers, since print character data arrives in a continuous stream without addresses). There is no response message.

The EICard 300 sends a SCREEN CHAR DATA command to supply characters to be written to a screen or printer for the current session. There is no response message. The characters to be displayed or printed are as defined by the ASCII standard for the printable character range 0x20 to 0x7E. Codes outside this range are used for extended display characters that vary with the device being emulated. All the extended ASCII codes are considered displayable. Printer control functions are provided by separate commands.

The EICard 300 sends a SCREEN SET FG COLOR command to set the foreground color in which subsequent character data should be written for the current session. In the absence of such a command, the ICS 102 should assume green as the default foreground color. There is no response message.

The EICard 300 sends a SCREEN SET BG COLOR command to set the background color in which subsequent character data should be written for the current session. In the absence of such a command, the ICS should assume black as the default background color. There is no response message.

The EICard 300 sends a SCREEN SET ATTR command to set the character attribute in which subsequent character data should be written for the current session. There is no response message.

The EICard 300 sends a SCREEN UPDATE MARK command to mark points in the operation stream where a screen update is appropriate to be released to the viewer. This mark may be ignored, but may prove useful in avoiding screen flickering or jerky presentation. There is no response message.

The EICard 300 sends a LOST DATA MARK command to mark points in the operation stream where a loss of data has occurred due to host disconnection or buffer overflow within the card. These conditions are also accompanied by error messages or unsolicited status updates, but this mark serves to identify where the information gap occurred in the character data. This mark does not apply to display terminals, only to printers. There is no response message.

The EICard 300 sends a NEWLINE command to mark the end of a line and advance to the beginning of the next line of output for a printer session. There is no response message.

The EICard 300 sends a FORMFEED command to mark the end of a page and advance to the beginning of the next page of output for a printer session. There is no response message.

The EICard 300 sends a BEEP command when a momentary audible alarm is to be generated for the current session. There is no response message.

This opcode is reserved for use in debugging. It is not expected to occur in the product, but should not be considered an error if it does. The operation is variable length with the length provided in the usual location, so the data can be logged or ignored by the ICS 102, as desired. There is no response message.

The EICard 300 may send an ERROR operation to inform the ICS of an error condition. Usually, an error response is generated in response to a command, and is often the only response that can be generated. But the EICard 300 may send an unsolicited ERROR when it detects an error not related to a command that it received. The information provided with the ERROR opcode identifies the context in which the error occurred. The ERROR operation is supported with or without a valid firmware download, but the repertoire of error codes is restricted when no successful download has yet occurred. The context in which the error occurred is reported, where applicable, by including a command within the error code data. For example, if the error is due to an invalid command or parameter supplied, the offending command is included with the error response. If the error occurred as a result of a host log event, the host traffic leading up to the event, ending in an event marker, is included with the error. There is no response message. If the error is not associated with any context information, the length provided is 1 and only an error code is returned. Exact error code values and their interpretation are available in 'c' include file err.h. The type of context information made available with each error code is identified. It is intended that the ICS log certain opcodes and their related data to a log file associated with each EICard 300. For example, by directly saving all received ERROR operations (including opcode and length fields), a useful binary log file would be obtained which would require no further formatting to be decipherable. Another facility could translate the binary log file into a readable form.

In order to return recent host traffic as the context of an error, a pseudo opcode is defined to represent HOST TRAFFIC DATA. Although this operation never appears by itself in the traffic stream, it does appear as the context portion of an ERROR operation. The amount of data returned as the context of an error is determined by the emulation. The host traffic log data represents the traffic between the host and the card as a stream of bytes. The data transferred in both directions are included. There are two main types of entities represented in the log—data bytes and special markers. All log entries consist of two bytes—the high order byte comes first and identifies the type of data to follow. The low order byte is the actual value.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing operations using a universal character set in heterogenous computer systems, comprising steps of:
    (a) translating a first native character set input data stream to a first universal character set translated input data stream;
    (b) translating a second native character set input data stream to a second universal character set translated input data stream, the universal character set including distinct character codes for each character in the first native character set and the second native character set;
    (c) communicating the first translated input data steam and the second translated input data stream to the computer systems; and
    (d) performing computer system operations using the universal character set based on contents of the first translated input data stream and the second translated input data stream.

2. The method of claim 1, further comprising the steps of:
    (c) translating at least a portion of a first universal character set translated output data stream into first native character set output data stream;
    (d) translating at least a portion of a second universal character set translated output data stream into second native character set output data stream; and
    (e) communicating the first native character set output data stream to a first host computer system and the second native character set output data stream to a second host computer system such that host computer system operations can be performed using native character set output data streams.

3. The method of claim 1, wherein in the communicating step is performed via a transport control program/internet protocol (TCP/IP) communication network capable of communicating messages containing a universal character set data stream.

4. The method of claim 1, wherein the communicating step further comprises the steps of:
    (i) storing a first, first universal character set translated input data stream;
    (ii) comparing a second, subsequently received, first universal character set translated input data stream to the first, first universal character set translated input data stream to generate a difference signal; and (iii) communicating the difference signal to the computer system when the difference signal indicates that the first and the second first universal character set translated input data streams are different from one another such that the computer system receives the difference signal rather than either the first and the second first universal character set translated input data stream.

5. The method of claim 4 further comprising the step of sending a status signal periodically to determine whether a fault condition has occurred.

6. The method of claim 4 further comprising the step of performing operations based on contents of the difference signal.

7. An electronic monitoring and control system performing operations using a universal character set, the monitoring and control system being external to a plurality of heterogenous computer systems for monitoring operational processes in the computer systems, the monitoring and control system comprising:

(a) an intelligent card which translates a first native character set input data stream to a first universal character set translated input data stream and which translates a second native character set input data stream to a second universal character set translated input data stream, the universal character set including distinct character codes for each character in the first native character set and the second native character set; and (b) a monitoring and control unit, operatively coupled to the intelligent card, for receiving the first translated input data stream and the second translated input data stream from the intelligent card, the monitoring and control unit comprising at least one processor which performs operations using the universal character set based on contents of the translated first input data stream and the translated second input data stream.

8. The system of claim 7, further comprising a second intelligent card which translates a third native character set input data stream to a third universal character set translated input data stream.

9. The electronic monitoring and control system of claim 7 wherein the monitoring and control unit comprises:

(i) means for translating at least a portion of a first universal character set translated output data stream into first native character set output data stream;

(ii) means for translating at least a portion of a second universal character set translated output data stream into second native character set output data stream; and (iii) means for communicating the first native character set output data stream to a first host computer system and the second native character set output data stream to a second host computer system such that host computer system operations can be performed using native character set output data streams.

10. The electronic monitoring and control system of claim 7 wherein the intelligent card and the monitoring and control unit are operatively coupled together through a transport control program/internet protocol (TCP/IP) communication network capable of communicating messages containing a universal character set encoded data stream.

11. The electronic monitoring and control system of claim 7 wherein the operations performed by the electronic monitoring and control system comprise external electronic monitoring and control functions for a computer system.

12. The electronic monitoring and control system of claim 11 wherein the first and the second input data stream represent information related to processes executed by the computer system, the computer system being an entity selected from a group consisting of: a single processor, at least two processors, a single computer, at least two computers, a single network of computers, at least two networks of computers, a single enterprise, at least two enterprises, a single data center, and at least two data centers, a private branch exchange (PBX) system, a telecommunications switch, a security system, a building environmental control system, a humidity control, a temperature control, a heating ventilating or air conditioning (HVAC) control, power line, and a power generator.

13. The electronic monitoring and control system of claim 12 wherein the information related to processes executed by the computer system within the first and the second input data stream is selected from a group consisting of: at least one value retrieved by a process from a state variable, a result of a process, an information signal, a warning signal, an error signal, a console screen signal, a power on signal, an initial microcode load (IML) signal, an initial program load (IPL) signal, an operating system (OS) shutdown signal, and a power switch off signal.

14. An article of manufacture comprising a program storage medium readable by a computer having a memory, the medium tangibly embodying one or more programs of instructions executable by the computer to perform method steps for performing operations using a universal character set in heterogenous computer systems, the method comprising the steps of:

(a) translating a first native character set input data stream to a first universal character set translated input data stream;

(b) translating a second native character set input data stream to a second universal character set translated input data stream, the universal character set including distinct character codes for each character in the first native character set and the second native character set; and (c) communicating the first translated input data stream and the second translated input data stream to the computer systems; and (d) performing computer system operations using the universal character set based on contents of the first translated input data stream and the second translated input data stream.

15. The article of manufacture of claim 14, the method further comprising the steps of:

(d) translating at least a portion of a first universal character set translated output data stream into first native character set output data stream;

(e) translating at least a portion of a second universal character set translated output data stream into second native character set output data stream; and (f) communicating the first native character set output data stream to a first host computer system and the second native character set output data stream to a second host computer system such that host computer system operations can be performed using native character set output data streams.

16. The article of manufacture of claim 14, wherein the communicating step further comprises the steps of:

(i) storing a first, first universal character set translated input data strea;

(ii) comparing a second, subsequently received, first universal character set translated input data stream to the first, first universal character set translated input data stream to generate a difference signal; and (iii) communicating the difference signal to the computer system when the difference signal indicates that the first and the second first universal character set translated input data streams are different from one another such that the computer system receives the difference signal rather than either the first and the second first universal character set translated input data stream.

17. The article of manufacture of claim 14, the method further comprising the step of sending a status signal periodically to determine whether a fault condition has occurred.

18. The article of manufacture of claim 16, the method further comprising the step of performing operations based on contents of the difference signal.

* * * * *